(No Model.)

A. S. KEATING.
ELECTRIC BATTERY.

No. 474,912. Patented May 17, 1892.

WITNESSES:
Frank S. Ober
M. Rosenbaum

INVENTOR
Alphonso S. Keating
BY W. J. Johnston
ATTORNEY.

UNITED STATES PATENT OFFICE.

ALPHONSO S. KEATING, OF CORRY, PENNSYLVANIA, ASSIGNOR OF ONE-HALF TO H. W. THAYER, OF SAME PLACE.

ELECTRIC BATTERY.

SPECIFICATION forming part of Letters Patent No. 474,912, dated May 17, 1892.

Application filed September 29, 1891. Serial No. 407,153. (No model.)

*To all whom it may concern:*

Be it known that I, ALPHONSO S. KEATING, a citizen of the United States, residing in Corry, county of Erie, and State of Pennsylvania, have invented certain new and useful Improvements in Electric Batteries, of which the following is a specification.

This invention relates to electric batteries, both secondary and primary, the object being to provide a construction whereby the creeping of salts to the outside of the containing-vessel is prevented. The deterioration and bad features generally produced by creeping salts are well known and need no comment here. Various means have been provided for overcoming this objectionable feature in batteries, among which may be mentioned the application of a thin stratum of oil on the surface of the solution. This means, however, is very objectionable for the reason that the cell becomes untidy. When the elements of the battery are removed, they become covered with oil.

My invention consists in placing an annular receptacle around the inside of the battery-cell at a point between the surface of the solution and the outside of the cell. In this receptacle I place a quantity of oil, which acts as an effectual bar to the creeping salts.

This invention will now be described in detail and with reference to the accompanying drawings, in which—

Figure 1:
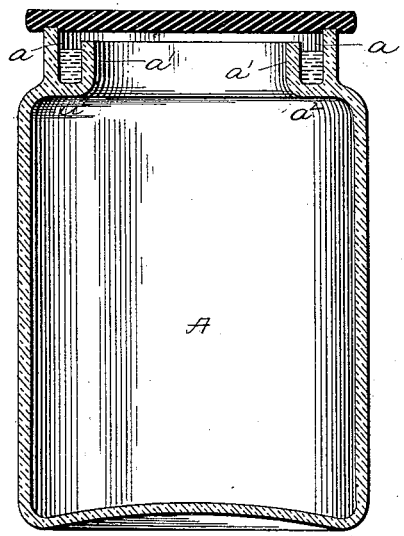
Figure 2:
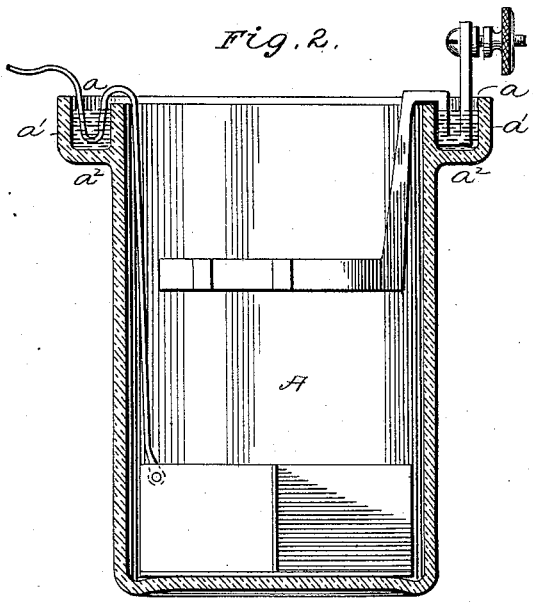
Figure 4:
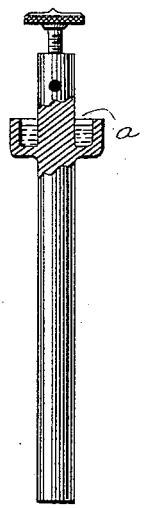
Figure 5:
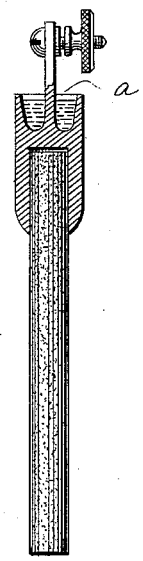
Figure 3:
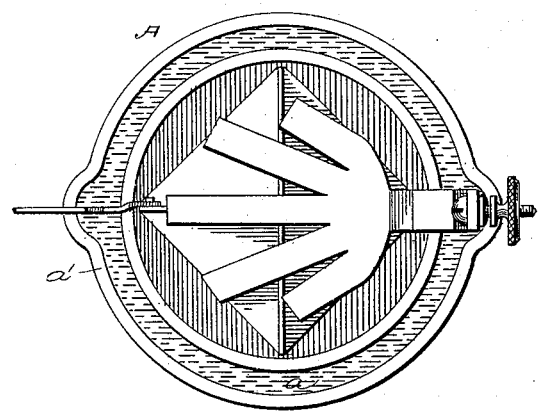

Figure 1 represents a vertical section of a cell constructed in accordance with my improvement. Fig. 2 is a similar section of a different form of cell, showing an old arrangement of a receptacle on the outside of a cell. Fig. 3 is a plan of the cell represented in Fig. 2, and Figs. 4 and 5 are views showing my invention applied directly to the elements of the battery.

A represents the ordinary cell or containing-jar of a battery, whether it be primary or secondary. Around the mouth of this cell I form an annular receptacle $a$, which may be made by a flange $a'$, arranged parallel to the neck of the cell and connected therewith by a horizontal or curved portion $a^2$. Into this receptacle I pour a quantity of oil, paraffine, or suitable material, over or through which it is impossible for the creeping salts to pass.

In Fig. 2 a form of gravity-cell is illustrated having the receptacle on the outside.

In a Leclanché cell the salts are prevented from creeping to the upper end of the electrodes by a receptacle surrounding their upper ends, similar to those described. The carbon pencil or plate may have a casting of the form shown in Fig. 5 secured to its upper end, while the zinc pencil or plate may have a receptacle formed integrally upon it, as shown in Fig. 4. The drawings show the receptacle as located above the line of the solution; but it is obvious that it may be lower down in the cell, so long as the flange $a'$ is high enough to prevent the solution from running into the receptacle.

Having thus described my invention, I claim—

1. In a battery-cell, the combination, with a battery element, of an oil-receptacle attached to said element or formed thereupon at a point above the surface of the solution.

2. The combination of a containing vessel or cell for batteries and an annular oil-receptacle around the inside of the neck of the same, for the purpose set forth.

3. In a battery-cell, the combination, with a battery element, of an oil-receptacle attached thereto or formed thereupon at a point between the solution and the outside of the cell.

In witness whereof I have hereunto signed my name in the presence of two subscribing witnesses.

ALPHONSO S. KEATING.

Witnesses:
H. W. THAYER,
J. B. DAVIS.